(12) United States Patent
Lin (10) Patent No.: US 7,861,643 B2
(45) Date of Patent: Jan. 4, 2011

(54) PISTON DEVICE

(75) Inventor: Cheng Feng Lin, Taipei (TW)

(73) Assignee: Unipoint Electric Mfg, Co., Ltd., Taipei (TW)

( * ) Notice: Subject to any disclaimer, the term of this patent is extended or adjusted under 35 U.S.C. 154(b) by 398 days.

(21) Appl. No.: 12/073,597

(22) Filed: Mar. 7, 2008

(65) Prior Publication Data

US 2009/0223363 A1 Sep. 10, 2009

(51) Int. Cl.
*F16J 1/02* (2006.01)
*F15B 15/00* (2006.01)

(52) U.S. Cl. .......................................... 92/258

(58) Field of Classification Search ............ 92/71, 92/255, 258, 260
See application file for complete search history.

(56) References Cited

U.S. PATENT DOCUMENTS 2,987,046 A * 6/1961 Atherton ..................... 92/255
3,828,657 A * 8/1974 Neuman ..................... 92/258
5,941,160 A * 8/1999 Kato et al. .................... 92/71

* cited by examiner

*Primary Examiner*—Thomas E Lazo
(74) *Attorney, Agent, or Firm*—Bacon & Thomas, PLLC (57) ABSTRACT

The present invention discloses a piston device which is disposed in a cylinder. The cylinder has a chamber including a bore and an inner wall. The piston device comprises a piston body and at least an annular ring. The piston body has a top side and a bottom side, the diameter of the piston body is smaller than the bore, and either one of the top side or the bottom side has a convex portion. The annular ring is clamped to the top side or the bottom side by engaging said convex portion, and the annular ring has a diameter slightly larger than the diameter of the piston body. While said piston therein moves reciprocally at which the axial direction of the cylinder, the annular ring slides against the inner wall but the piston body has no contact with said inner wall.

19 Claims, 7 Drawing Sheets

PISTON DEVICE

BACKGROUND OF THE INVENTION

1. Field of the Invention

The present invention relates to a piston device, and more particularly to a piston device formed of a piston body with attached wear proof component.

2. Description of the Related Art

The principle of operation of a piston within a cylinder is driving the piston in oscillating movement to reproduce motive force by combusting the compressed fuel. Theoretically, the diameter of the piston must be slightly larger than the bore of the cylinder for better sealed effect between the piston and the cylinder, so as to that the combustion gas can be fully sealed from leaking as being effectively used to drive the piston. But, such said design has a main disadvantage of the damage of piston due to excessive wear between the inner wall of the cylinder and the piston. Hence, a superior protection of the piston is very required, which the conventional solution is coating a kind of material of wear resistant on the whole surface of the piston.

However, although the piston smoothly reciprocate in the bore of the cylinder after the wear resistance process applied on the surface of the piston, both issues of a larger cost and a practicability on the piston are also happened. The piston must be tightly fit and completely sealed against the inner wall of the cylinder. Namely, the piston is particularly and precisely made for a specific cylinder, whence whenever a new cylinder is made, a new piston is required for fitting the new cylinder; if the size of the piston does not fit the cylinder, such a piston will be obsolete and another new one has to be made again and at the meantime the wear resistance process as coating material on the whole surface of the piston will be also repeated. For such said reasons, to produce this piston precisely fitted within the cylinder with wear resistance surface thereon is not extremely economic benefit.

According to the problem described above, the inventor of the invention herein conducted extensive research and experimentation that culminated in the successful development and design; hence a piston device thereof is addressed as the foundation and the realization for improving described problems.

SUMMARY OF THE INVENTION

Therefore, it is one of objectives of the present invention to provide a piston device to simplify the wear resistant process.

In a first aspect, this invention provides a piston device disposed in a cylinder which has a chamber including a bore and an inner wall. The piston device comprises a piston body and at least an annular ring. The piston body has a top side and a bottom side, the diameter of the piston body is smaller than the bore, and either one of the top side or the bottom side has a convex portion. The annular ring is clamped to the top side or the bottom side by engaging the convex portion, and the annular ring has a diameter slightly larger than the diameter of the piston body. While the piston device therein moves reciprocally at the axial direction of the cylinder, the annular ring contacts with the inner wall but the piston body has no contact with the inner wall.

Preferably, the annular ring is made of Teflon.

Preferably, the surface of the annular ring is coated with Teflon.

Preferably, annular ring is engaged to the convex portion by tight fit.

Preferably, the convex portion has a first step shape and a second step shape.

In a second aspect, the present invention provides a piston device disposed in a cylinder which has a chamber including a bore and an inner wall. The piston device comprises a piston body and at least a disc portion. The piston body has a top side and a bottom side, and the diameter of the piston body smaller than the bore, either one of the top side or the bottom side has a concave portion. The disc portion is clamped to the top side or the bottom side by engaging the concave portion, and the disc portion has a diameter slightly larger than the diameter of the piston body. While the piston device therein moves reciprocally at the axial direction of the cylinder, the disc portion contact with the inner wall but the piston body has no contact with the inner wall.

Preferably, the disc portion comprises an annular ring and a limiting element, and the limiting element is inserted into the concave portion through the hole of said annular ring to clamp the annular ring to the piston body.

Preferably, the limiting element is engaged with the disc portion and the concave portion by tight fit.

As illustrated above, the piston device in accordance with the present invention has the following advantages:

(i) Only the annular ring or the disc portion is required to apply the wear resistant material, or made of resistant material, this can simplify the wear resistant process.

(ii) The sealing capability of preventing the combustion gas from leaking for the piston device in operation can be enhanced by the annular ring or disc portion.

(iii) The heat generated once piston device operated within cylinder, can be effectively dissipated to cylinder wall through annular ring or disc portion.

With these and other objects, advantages, and features of the invention that may become hereinafter apparent, the nature of the invention may be more clearly understood by reference to the detailed description of the invention, the preferred embodiments and to the several drawings herein.

BRIEF DESCRIPTION OF THE DRAWING

The subject matter regarded as the invention is particularly pointed out and distinctly claimed in the concluding portion of the specification. The invention together with features and advantages thereof may best be understood by reference to the following detailed description with the accompanying drawings in which:

DETAILED DESCRIPTION OF THE PREFERRED EMBODIMENT

Following is brief description with the attached drawings, in accordance with a preferred embodiment of this invention of the piston device.

Figure 1:
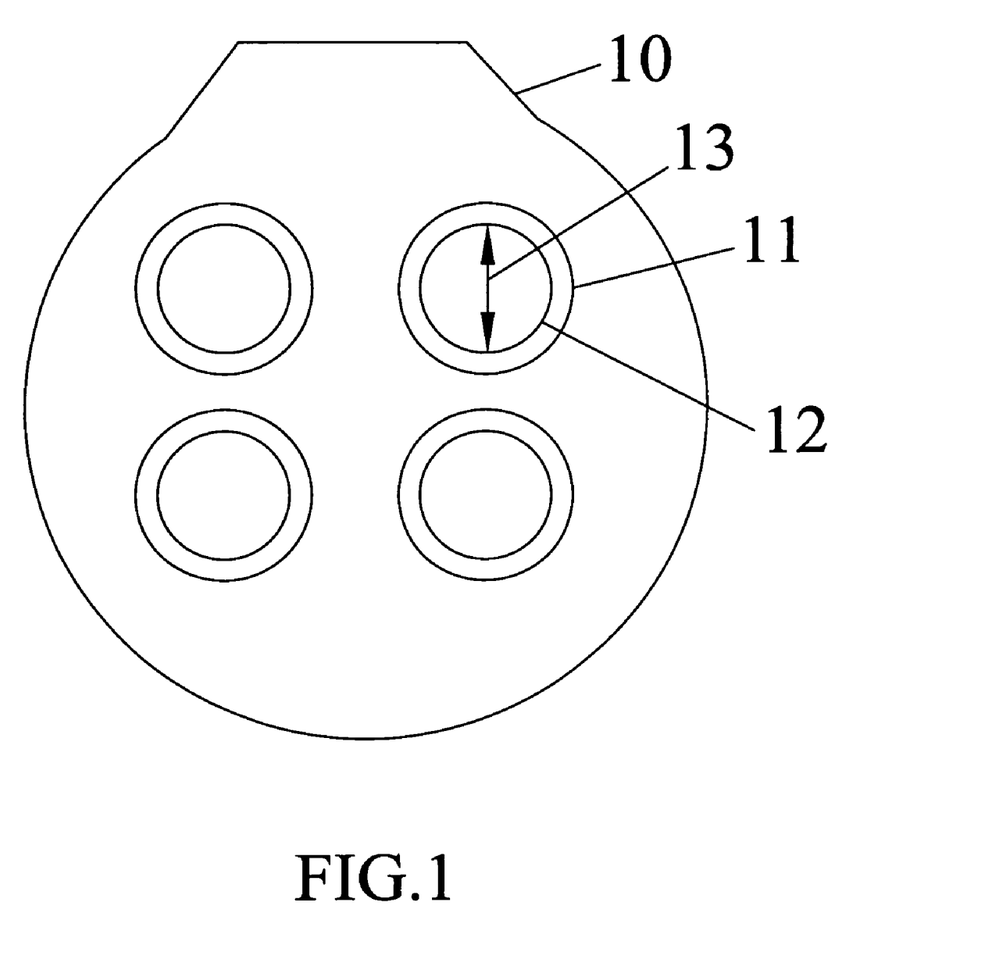
FIG. 1 illustrates a plain view of common cylinder.
Figure 2A:
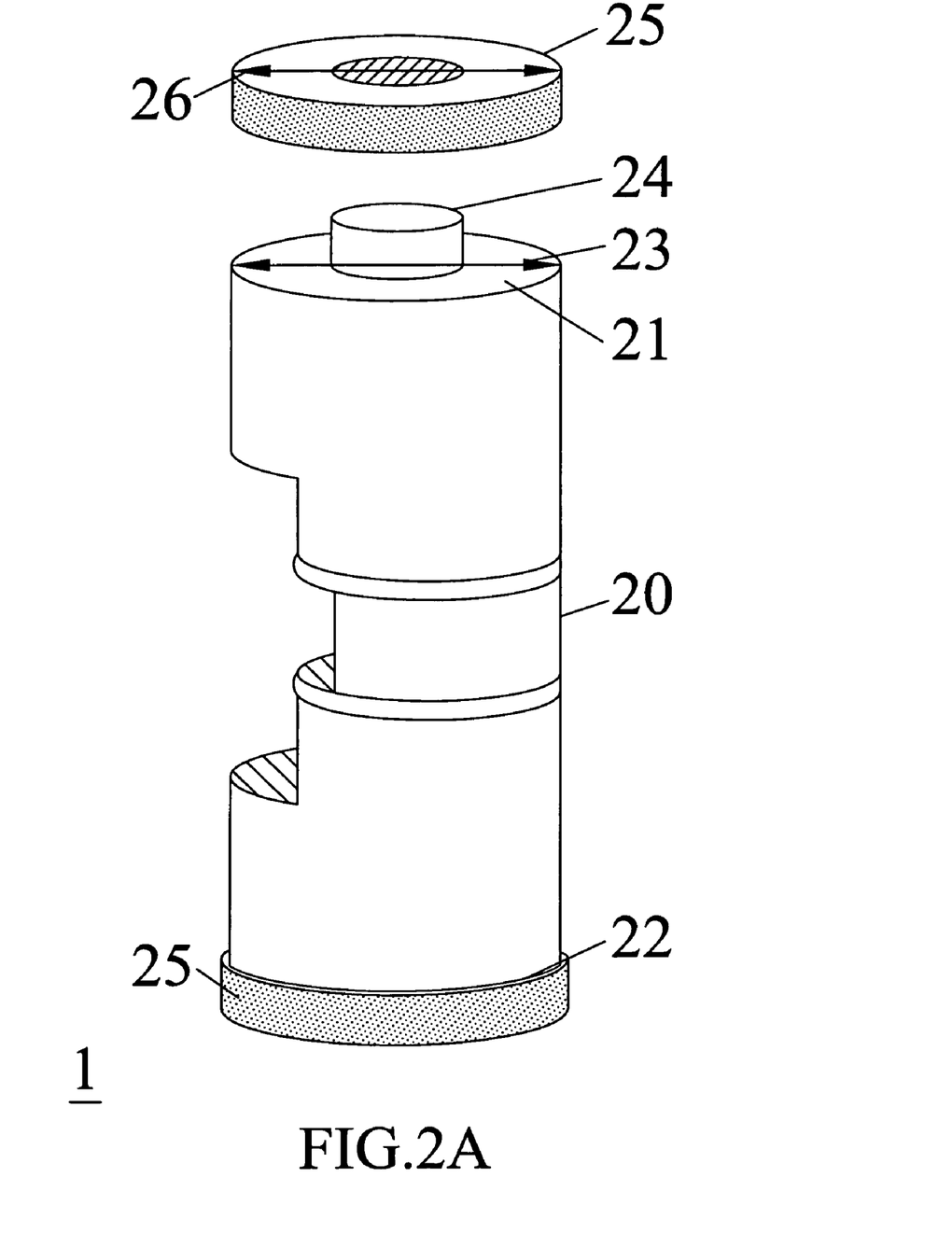
FIG. 2A illustrates a three-dimensional view of the piston device with the first embodiment in accordance with the present invention.
Figure 2B:
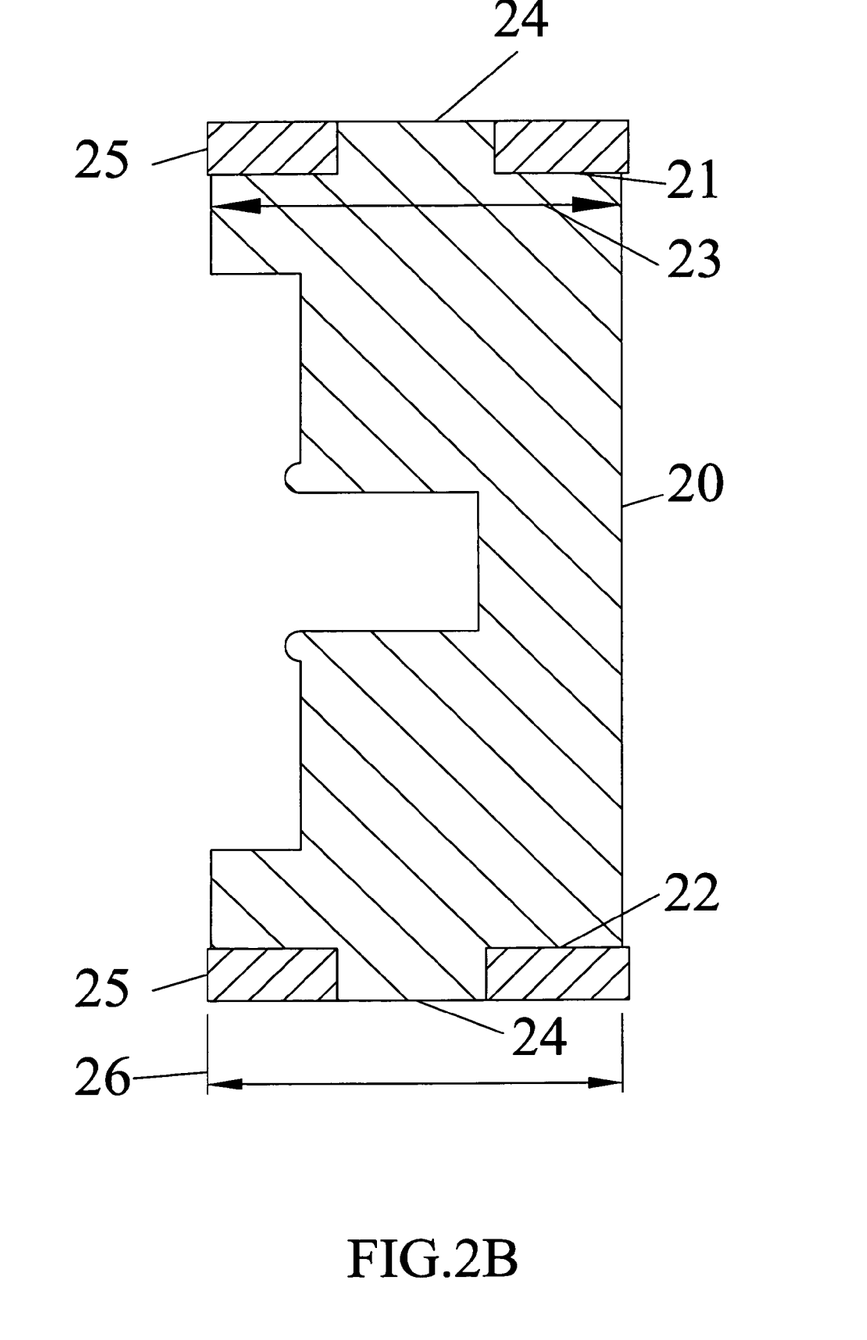
FIG. 2B illustrates a sectional view of the piston device with the first embodiment in accordance with the present invention.

FIGS. 1, 2A and 2B illustrate a plain view of the common cylinder, a three-dimensional and a sectional view of the first embodiment of the piston device in accordance with the present invention respectively. In FIG. 1, the cylinder 10 has a plurality of chambers 11 where the piston device is disposed. In FIG. 2A, the piston device 1 comprises a piston body 20 and two annular rings 25. The piston body 20 has a top side 21 and a bottom side 22, and either one of the top side 21 or the bottom side 22 has a convex portion 24. Since the top side 21 and the bottom side 22 has same design, the top side 21 is addressed instead as for easier to understand in following description. The annular ring 25 and convex portion 24 are engaged by tight fit, so as to engage the annular ring 25 on top side 21 and bottom side 22, the diameter 23 of the piston body 20 is smaller than the bore 13 of the chamber 11, and the diameter 26 of annular ring 25 is slightly larger than the diameter 23 of piston body 20.

While the piston device 1 therein moves reciprocally at the axial direction of the chamber 11, the annular ring 25 contact with the inner wall 12 but the piston body 20 has no contact with the inner wall 12. Therefore, the piston device 1 can just contact with inner wall 12 of the chamber 11 through annular ring 25, so only annular ring 25 is required to apply a wear resistance process. Therefore, the manufacture cost can be reduced. Besides, the annular ring 25 can enhance the sealing capability so as to prevent the combustion gas from leaking from top side and enhance the heat dissipation, i.e. the heat generated while piston device 1 operated within chamber 11, can be dissipated to cylinder wall 12 through the annular ring 25. Preferably, the convex portion can be a cylindrical part, and the cylindrical part can be different shape based upon the requirements. Preferably, the annular ring 25 and convex portion 24 are engaged by riveting tightly.

Figure 3:
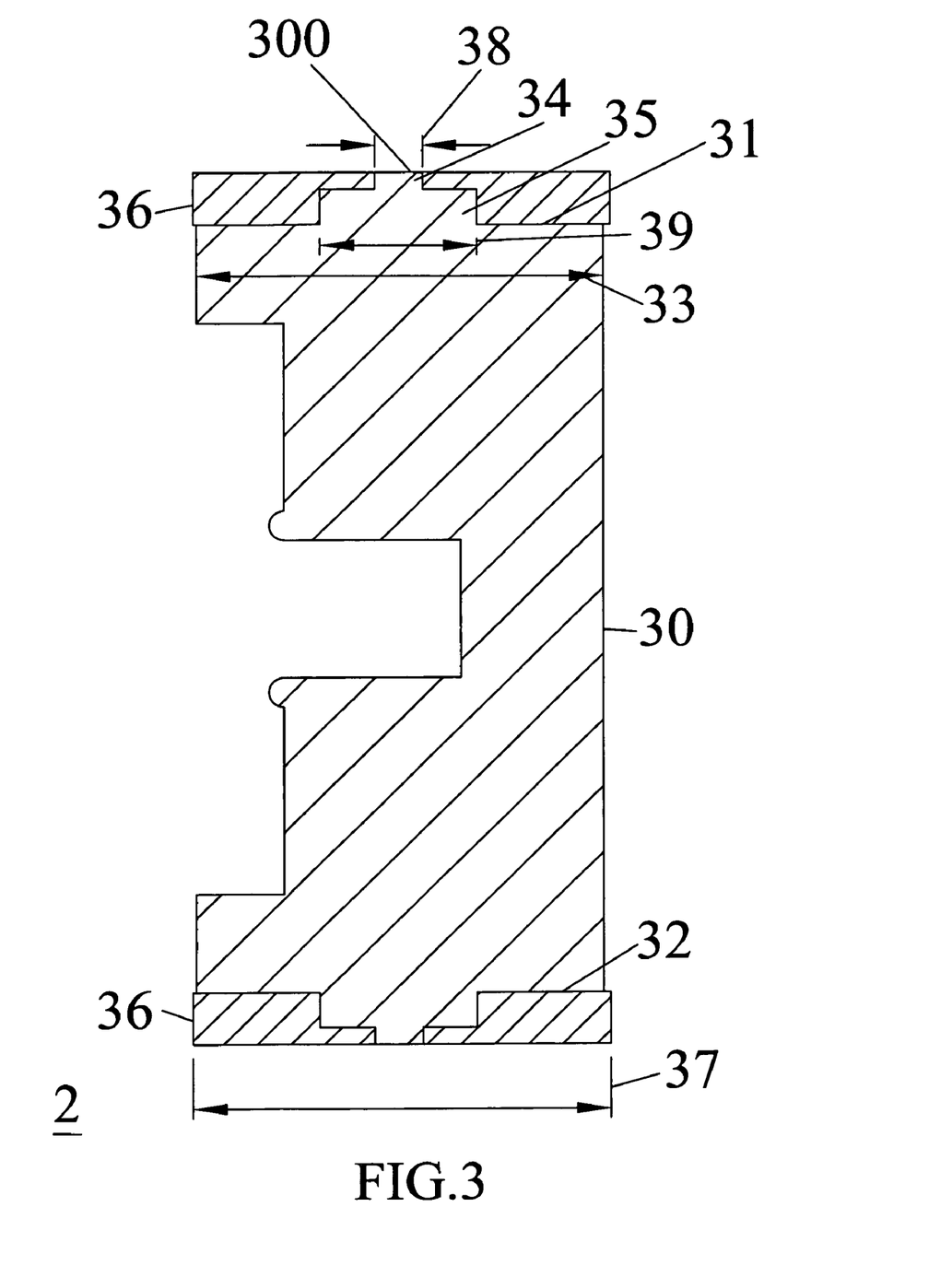
FIG. 3 illustrates a sectional view of the piston device with the second embodiment in accordance with the present invention.

FIG. 3 illustrates a sectional view of the second embodiment of the piston device in accordance with the present invention. The difference between the piston device 2 and the piston device 1 is that the convex portion 300 has a first step shape 34 and a second step shape 35. The annular ring 36 has a first inner diameter 38 and a second inner diameter 39 corresponding to the first step shape 34 and the second step shape 35 respectively for better effect of clamping the annular ring 36 and the convex portion 300 together by tight fit, and engaged on the top side 31 or the bottom side 32. The two-step shape convex portion 300 can enable tighter connection of the annular ring 36 and convex portion 300.

Preferably, the annular ring 36 and 25 can be made of Teflon, or the surfaces of annular ring 36 and 25 are coated with Teflon for wear resistance. In addition, the above-described devices are with reference to the preferred embodiments, it is intended that the invention be not limited by any of the details of the description therein but includes all the embodiments which fall within the scope of the present invention.

Figure 4A:
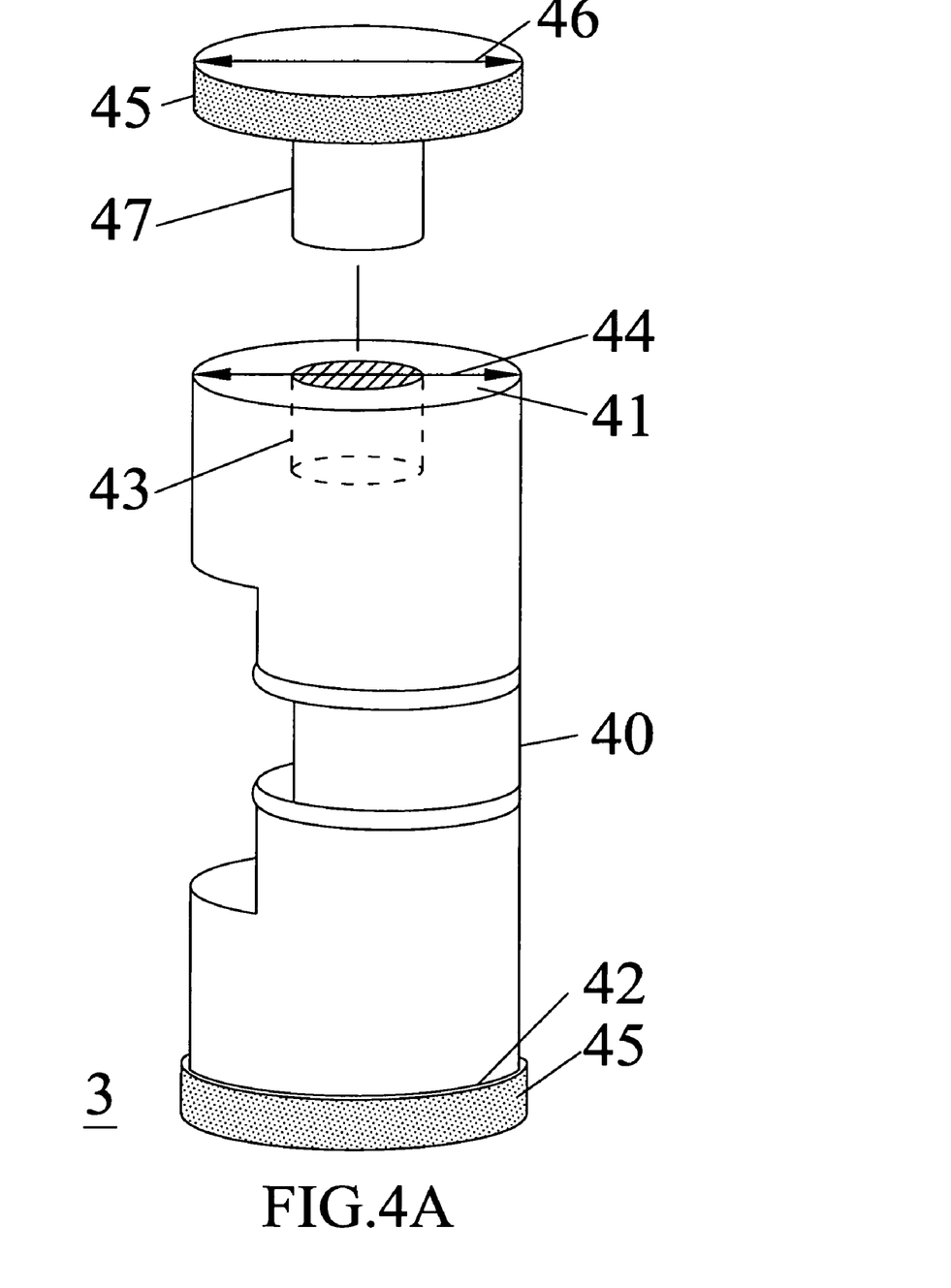
FIG. 4A illustrates a three-dimensional view of the piston device with the third embodiment in accordance with the present invention.
Figure 4B:
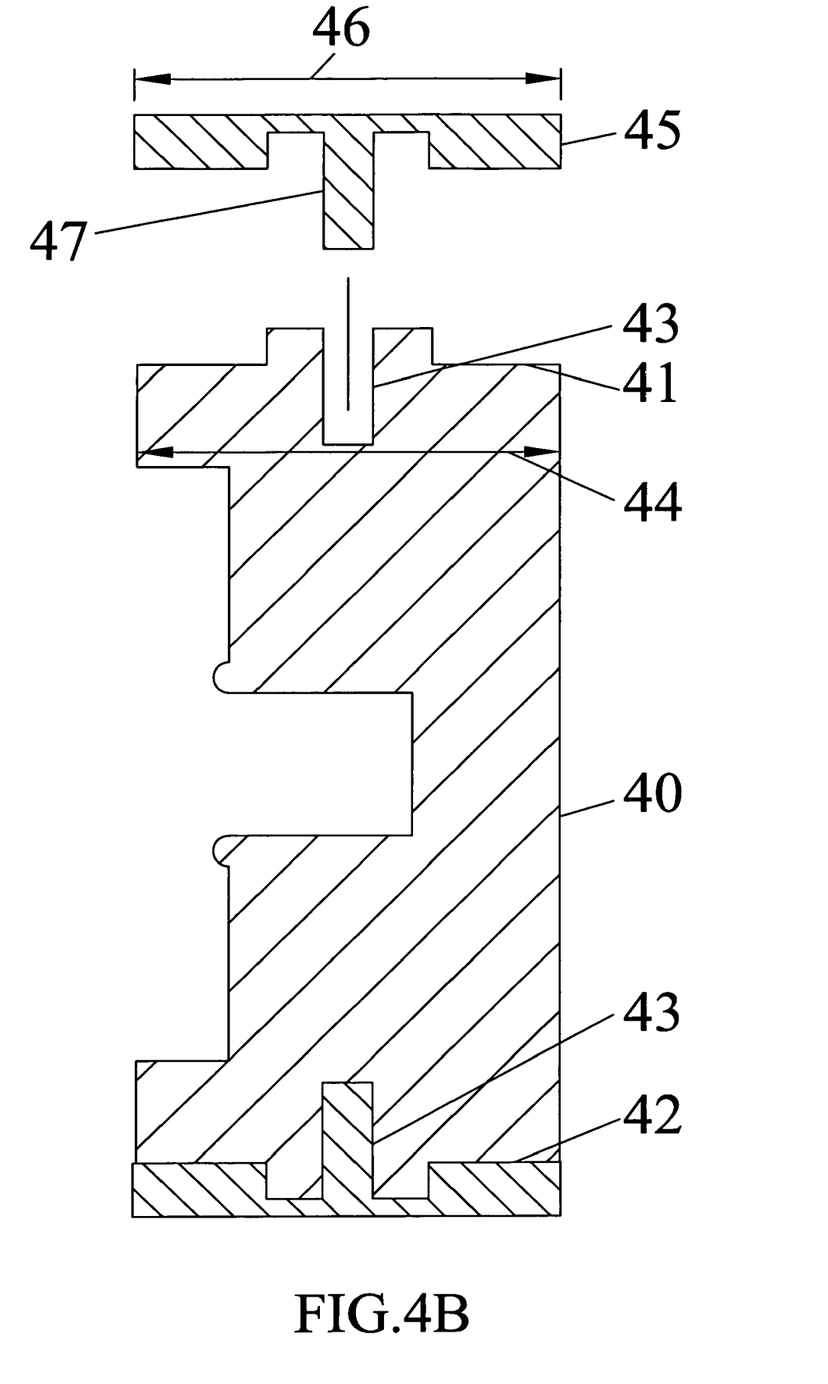
FIG. 4B illustrates a sectional view of the piston device with the third embodiment in accordance with the present invention.

FIGS. 4A and 4B illustrate a three-dimensional and sectional view of the third embodiment of the piston device in accordance with the present invention. The piston device 3 comprises a piston body 40 and at least a disc portion 45. The piston body 40 has a top side 41 and a bottom side 42, and each of the top side 41 and the bottom side 42 has a concave portion 43 respectively. Since the top side 41 and the bottom side 42 illustrated in FIGS. 4A and 4B have same design, the top side 41 is addressed instead in the following description as for easier to understand. The disc portion 45 has a cylindrical part 47 which can be engaged to the concave portion 43 by riveting tightly, so as to clamp the disc portion 45 to the top side 41. The diameter 44 of the piston body 40 is smaller than the bore 13, and the disc portion 45 has a diameter 46 slightly larger than the diameter 44 of the piston body 40. While the piston device 3 therein moves reciprocally at which the axial direction of the chamber 11, the disc portion 45 contacts with the inner wall 12 but the piston body 40 has no contact with the inner wall 12.

Figure 5:
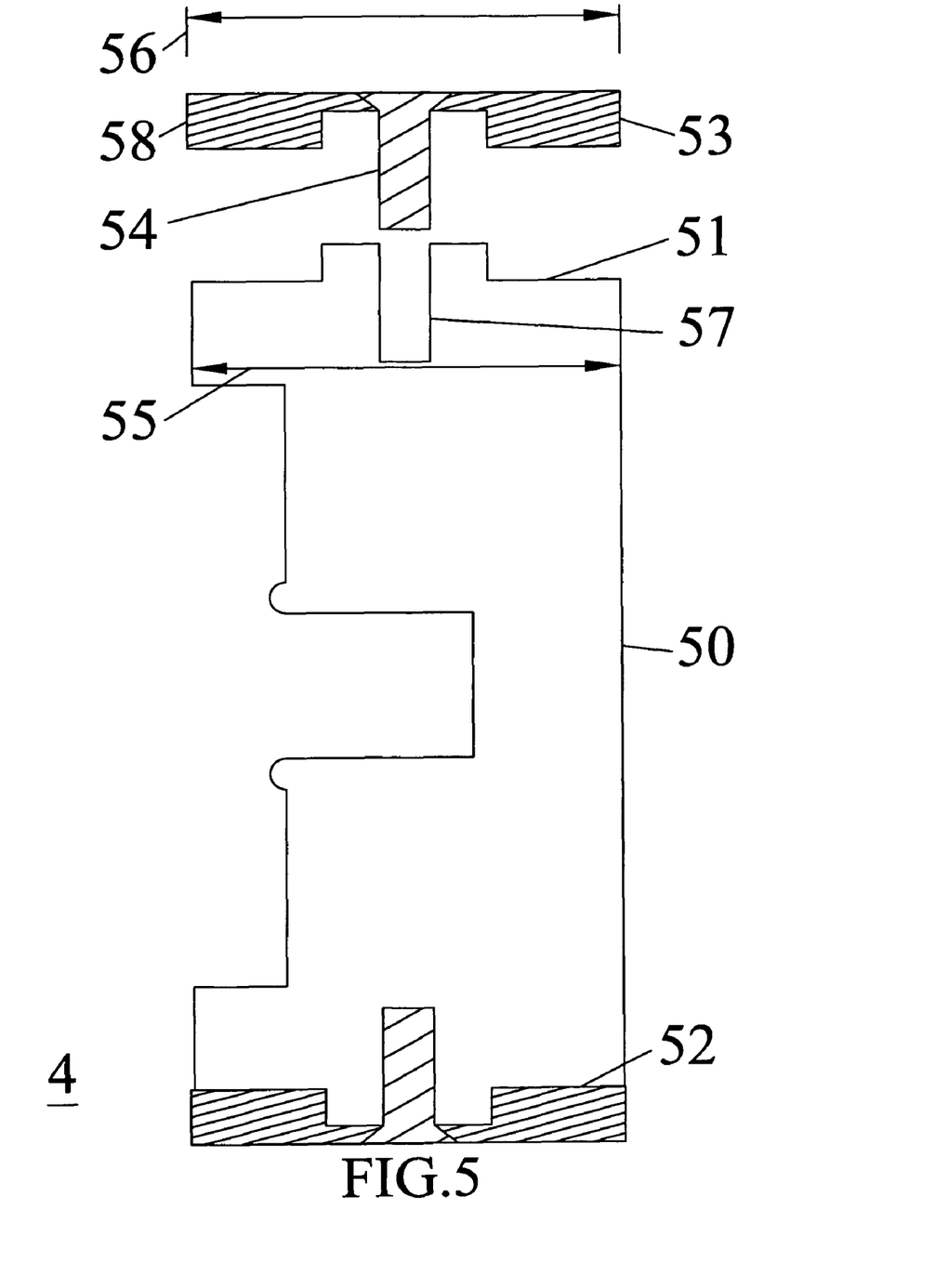
FIG. 5 illustrates a sectional view of the piston device with the fourth embodiment in accordance with the present invention.

FIG. 5 illustrates a sectional view of the fourth embodiment of the piston device in accordance with the present invention. The difference between the piston device 4 and piston device 3 is that the disc portion 58 of piston device 4 consists of at least one annular ring 53 and at least one limiting element 54 which is used to tightly inserted into concave portion 57 through the hole of annular ring 53, so as to clamp the annular ring 53 to the top side 51 or the bottom side 52.

Therefore, since both piston devices 3 and 4 contact with inner wall 12 through disc portion 45 and annular ring 53 respectively, wear resistance process is only required to apply on disc portion 45 and annular ring 53 while not on piston body 40 and 50. Consequently, the manufacture cost can be reduced. Preferably, the disc portion 45 and annular ring 53 can be made of Teflon, or the surfaces of the disc portion 45 and annular ring 53 can be coated with Teflon for wear resistance.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A piston device, disposed in a cylinder having a chamber, said chamber having a bore and an inner wall, and said piston device comprising:
   a piston body, having a diameter smaller than said bore, said piston body having a top side and a bottom side, and either one of said top side or said bottom side having a convex portion; and
   at least an annular ring, having a diameter slightly larger than the diameter of said piston body, clamped to said top side or said bottom side by engaging said convex portion;
   wherein said annular ring contacts with said inner wall but said piston body has no contact with said inner wall while said piston device moves reciprocally at the axial direction of said cylinder; and
   wherein said annular ring is made of Teflon.

2. The piston device of claim 1, wherein the central axis of said convex portion is in line with the central axis of said piston body.

3. The piston device of claim 1, wherein said convex portion is a cylindrical part.

4. The piston device of claim 1, wherein said annular ring is engaged to said convex portion by tight fit.

5. The piston device of claim 4, wherein said annular ring is engaged to said convex portion by rivets.

6. The piston device of claim 1, wherein said convex portion has a first step shape and a second step shape, and the diameter of said first step shape is smaller than the diameter of said second step shape, and said annular ring has a first inner diameter corresponding to said first step shape and a second inner diameter corresponding to said second step shape, and said first inner diameter is smaller than said second inner diameter.

7. The piston device of claim 1, wherein the surface of said annular ring is coated with Teflon.

8. A piston device, disposed in a cylinder having a chamber, said chamber having a bore and an inner wall, and said piston device comprising:
- a piston body, having a diameter smaller than said bore, said piston body having a top side and a bottom side, and either one of said top side or said bottom side having a concave portion; and
- at least an disc portion, having a diameter slightly larger than the diameter of said piston body, clamped to said top side or said bottom side by engaging said concave portion;
- wherein said disc portion contacts with said inner wall but said piston body has no contact with said inner wall while said piston device moves reciprocally at the axial direction of said cylinder;
- wherein said disc portion comprises an annular ring and a limiting element, and said limiting element is inserted into said concave portion through the hole of said annular ring to clamp said annular ring to said piston body.

9. The piston device of claim 8, wherein the axis of said limiting element is in line with the axis of said piston body.

10. The piston device of claim 8, wherein said limiting element is engaged with said disc portion and said concave portion by tight fit.

11. The piston device of claim 10, wherein said limiting element is engaged with said disc portion and said concave portion by rivets.

12. The piston device of claim 8, wherein said annular ring is made of Teflon.

13. The piston device of claim 8, wherein the surface of said annular ring is coated with Teflon.

14. The piston device of claim 8, wherein said disc portion comprises a cylindrical part.

15. The piston device of claim 14, wherein the axis of said cylindrical part is in line with the axis of said piston body.

16. The piston device of claim 14, wherein said cylindrical part is engaged with said concave portion by tight fit.

17. The piston device of claim 14, wherein said cylindrical part is engaged with said concave portion by rivets.

18. The piston device of claim 8, wherein said disc portion is made of Teflon.

19. The piston device of claim 8, wherein the surface of said disc portion is coated with Teflon.

* * * * *